US012642175B2

(12) United States Patent
Roth et al.

(10) Patent No.: US 12,642,175 B2
(45) Date of Patent: Jun. 2, 2026

(54) CROP QUANTITY SENSING SYSTEM AND METHOD FOR A MOWER DRIVE ASSEMBLY

(71) Applicant: DEERE & COMPANY, Moline, IL (US)

(72) Inventors: Darin L. Roth, Batavia, IA (US); Kevin M. Tacke, Oskaloosa, IA (US)

(73) Assignee: Deere & Company, Moline, IL (US)

( * ) Notice: Subject to any disclaimer, the term of this patent is extended or adjusted under 35 U.S.C. 154(b) by 995 days.

(21) Appl. No.: 17/739,359

(22) Filed: May 9, 2022

(65) Prior Publication Data

US 2023/0354746 A1     Nov. 9, 2023

(51) Int. Cl.
| | |
|---|---|
| *A01D 41/127* | (2006.01) |
| *A01D 43/10* | (2006.01) |
| A01D 43/08 | (2006.01) |

(52) U.S. Cl.
CPC ..... *A01D 41/1271* (2013.01); *A01D 41/1274* (2013.01); *A01D 43/105* (2013.01); *A01D 43/08* (2013.01)

(58) Field of Classification Search
CPC ........ A01D 41/00–41/16; A01D 43/00–43/16; A01D 34/00–34/905; A01D 43/08; A01D 43/105; A01F 29/00–29/22
See application file for complete search history.

(56) References Cited

U.S. PATENT DOCUMENTS

| | | | | |
|---|---|---|---|---|
| 4,130,980 A | * | 12/1978 | Fardal | ................ A01D 41/1274 56/DIG. 15 |
| 5,710,432 A | | 1/1998 | Bell | |
| 6,002,472 A | | 12/1999 | Naka et al. | |

(Continued)

FOREIGN PATENT DOCUMENTS

| | | | | |
|---|---|---|---|---|
| DE | 102014219049 A1 | * | 3/2016 | ............. A01D 43/10 |
| EP | 0958729 A1 | | 11/1999 | |

(Continued)

OTHER PUBLICATIONS

Extended European Search Report and Written Opinion issued in European Patent Application No. 23172004.6, dated Oct. 10, 2023, in 07 pages.

(Continued)

*Primary Examiner* — Joseph M Rocca
*Assistant Examiner* — Madeline I Runco
(74) *Attorney, Agent, or Firm* — Taft Stettinius & Hollister LLP; Stephen F. Rost

(57)     ABSTRACT

An agricultural machine capable of sensing a harvested crop load includes a mower or mower conditioner implement, which may be referred to as a crop cutting implement, and a retractable linear device such as a spring or linear actuator. The crop cutting implement includes a flexible drive assembly with an endless loop, such as a belt, that is driven and supported by rollers. The retractable linear device resists movement of a first roller relative to a second roller. With this arrangement various characteristics of the agricultural machine, all of which are proxies for the position of the first roller relative to the second roller, may be measured by a crop load sensor to determine the quantity or load of harvested crop being processed by the flexible drive assembly of the agricultural machine.

19 Claims, 7 Drawing Sheets

(56)     References Cited

U.S. PATENT DOCUMENTS

| | | | |
|---|---|---|---|
| 6,213,870 B1* | 4/2001 | Satzler | A01F 7/062 |
| | | | 460/7 |
| 6,475,081 B2* | 11/2002 | Coers | A01D 41/127 |
| | | | 56/10.2 G |
| 2002/0187819 A1 | 12/2002 | Shinners et al. | |
| 2009/0241499 A1* | 10/2009 | Maertens | A01D 41/1276 |
| | | | 56/11.1 |
| 2019/0289787 A1* | 9/2019 | Heitmann | A01D 41/1271 |
| 2020/0375108 A1* | 12/2020 | Nielsen | A01D 43/085 |

FOREIGN PATENT DOCUMENTS

| | | | |
|---|---|---|---|
| EP | 1862056 A1 | 12/2007 | |
| EP | 3146833 A1 | 3/2017 | |
| EP | 3461316 A1 | 4/2019 | |
| WO | WO 2022229736 A1 | 11/2022 | |

OTHER PUBLICATIONS

"V-Belt Tension Methods & Instructions", Seiffert Industrial, https://www.seiffertindustrial.com/belt-tension-methods-instructions/, 7 pages, publicly available at least as early as May 9, 2022.

* cited by examiner

CROP QUANTITY SENSING SYSTEM AND METHOD FOR A MOWER DRIVE ASSEMBLY

FIELD OF THE DISCLOSURE

The present disclosure relates to sensing crop quantity or load and, in particular, to sensing crop quantity or load in various mower assemblies based on other characteristics of the mower.

BACKGROUND OF THE DISCLOSURE

Mowing machine architectures vary widely depending on their intended use. Consequently, obtaining universal crop yield information from mowing machines has posed a long-time challenge to manufacturers of commercial mowers and mower-conditioners. Commercial mowers have varying types of cutting, collecting, and conditioning components. Some mowing machines may only provide a cutting function and are without any crop processing or collecting capability. Other machines serve all three functions but with different cutting, collecting, or conditioning components and arrangements.

Crop type may influence the components and arrangement of the mowing machine. For example, early season alfalfa and other crops may be cut and conditioned using a pair of conditioning rolls. Conversely, a grassy crop may be conditioned using an impeller rotating on a single axis where tines scrape the cuticle layer of the individual blades to shorten drying down time of the grassy crop. Other crops, such as canola, may be cut without any conditioning at all, in which case a draper or flex draper with a reel assembly might be used for harvesting operations.

What is needed is a system and method for measuring the amount of crop moving through various mowing machines regardless of their components and arrangements.

SUMMARY

In an illustrative embodiment, an agricultural machine capable of sensing a harvested crop load comprises: a crop cutting implement including a frame and a flexible drive assembly supported by the frame, the flexible drive assembly including: a drive roller configured to rotate about a drive roller axis that is fixed relative to the frame, a flex roller that is driven by the drive roller to rotate about a flex roller axis that is movable relative to the drive roller axis; and an endless loop contacting the drive roller and the flex roller to drive rotation of the flex roller about the flex roller axis; a retractable linear device including a first end fixed relative to the frame and a second end movable relative to the frame, wherein the retractable linear device is configured to resist movement of the flex roller axis relative to the drive roller axis; and a crop load sensor configured to measure a characteristic of the agricultural machine associated with the quantity of harvested crop being processed by the flexible drive assembly.

In some embodiments, the agricultural machine of claim further comprises: a controller operatively coupled to the crop load sensor and configured to receive a signal from the crop load sensor indicative of the measured characteristic of the agricultural machine; wherein the controller is configured to determine the quantity of harvested crop being processed by the flexible drive assembly based on the signal indicative of the measured characteristic of the agricultural machine.

In some embodiments, the retractable linear device is a spring; and the crop load sensor is configured to measure the tension of the spring. In some embodiments, the retractable linear device is a linear actuator including a hollow rod and a piston configured to extend and retract relative to the hollow rod; and the crop load sensor is configured to measure the pressure of the linear actuator.

In some embodiments, the flexible drive assembly further includes a driven roller positioned inside the endless loop and rotatably driven by the endless loop about a driven roller axis that is fixed relative to the drive roller axis. In some embodiments, the flex roller is positioned outside of the endless loop. In some embodiments, the flex roller is rotatably coupled to a first portion of a bracket; and the second end of the retractable linear device is coupled to a second portion of the bracket. In some embodiments, the bracket is pivotably coupled to the frame at a pivot axis of the bracket passing through a third portion of the bracket. In some embodiments, the crop load sensor is configured to measure the degree of rotation of the bracket about the pivot axis. In some embodiments, the flex roller is positioned inside of the endless loop. In some embodiments, the flex roller is positioned outside of the endless loop.

In some embodiments, the crop load sensor is configured to measure the distance between the flex roller and a portion of the frame or a component fixedly coupled thereto. In some embodiments, the endless loop does not compact the harvested crop. In some embodiments, the endless loop does not engage with the harvested crop.

In some embodiments, the crop cutting implement further includes: an elongated roll rotationally driven by the drive roller via the endless loop; and a plurality of tines extending from the elongated roll and configured to engage with the harvested crop. In some embodiments, the crop cutting implement further includes: a pair of oppositely rotating elongated rolls that are configured to engage with the harvested crop; and a plurality of gears rotationally driven by the drive roller via the endless loop and coupled to the pair of oppositely rotating elongated rolls to cause rotation thereof.

In another illustrative embodiment, an agricultural machine capable of sensing a harvested crop load comprises: a crop cutting implement including a frame and a flexible drive assembly supported by the frame, the flexible drive assembly including: a drive roller configured to rotate about a drive roller axis that is fixed relative to the frame, a flex roller that is driven by the drive roller and configured to rotate about a flex roller axis that is movable relative to the drive roller axis; an endless loop contacting the drive roller and the flex roller to drive rotation of the flex roller about the flex roller axis; and a retractable linear device including a first end fixed relative to the frame and a second end movable relative to the frame; wherein the retractable linear device is configured to resist movement of the flex roller axis which is induced by a change in the quantity of harvested crop being processed by the flexible drive assembly; and wherein the crop load sensor is configured to measure a characteristic of the agricultural machine associated with the quantity of harvested crop being processed by the flexible drive assembly.

In some embodiments, the measured characteristic of the agricultural machine associated with the quantity of harvested crop being processed by the flexible drive assembly is at least one of: a tension of the retractable linear device; a pressure of the retractable linear device; a length of the retractable linear device; a degree of rotation of a bracket relative to the frame, the bracket being coupled at a first portion thereof to the flex roller and at a second portion thereof to the retractable linear device; and a location of the flex roller relative to a portion of the frame or a component fixedly coupled thereto. In some embodiments, the flexible drive assembly further includes a driven roller positioned inside the endless loop and rotatably driven by the endless loop about a driven roller axis that is fixed relative to the drive roller axis.

In another illustrative embodiment, a method of sensing a crop load harvested by an agricultural machine comprises: harvesting a crop with blades of a crop cutting implement of the agricultural machine; rotating a plurality of rollers of the crop cutting implement including a drive roller and a flex roller; wherein rotation of the flex roller is driven by rotation drive roller via an endless loop in contact with the drive roller and the flex roller; advancing harvested crop into the crop cutting implement of the agricultural machine causing an increase in the drive torque required to rotate the drive roller at a constant rotational speed; measuring a change in location of the flex roller induced by the increase in drive torque required to rotate the drive roller at a constant rotational speed as harvested crop is advanced into the crop cutting implement; and determining the quantity of harvested crop advanced into the crop cutting implement based on the measured change in location of flex roller.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
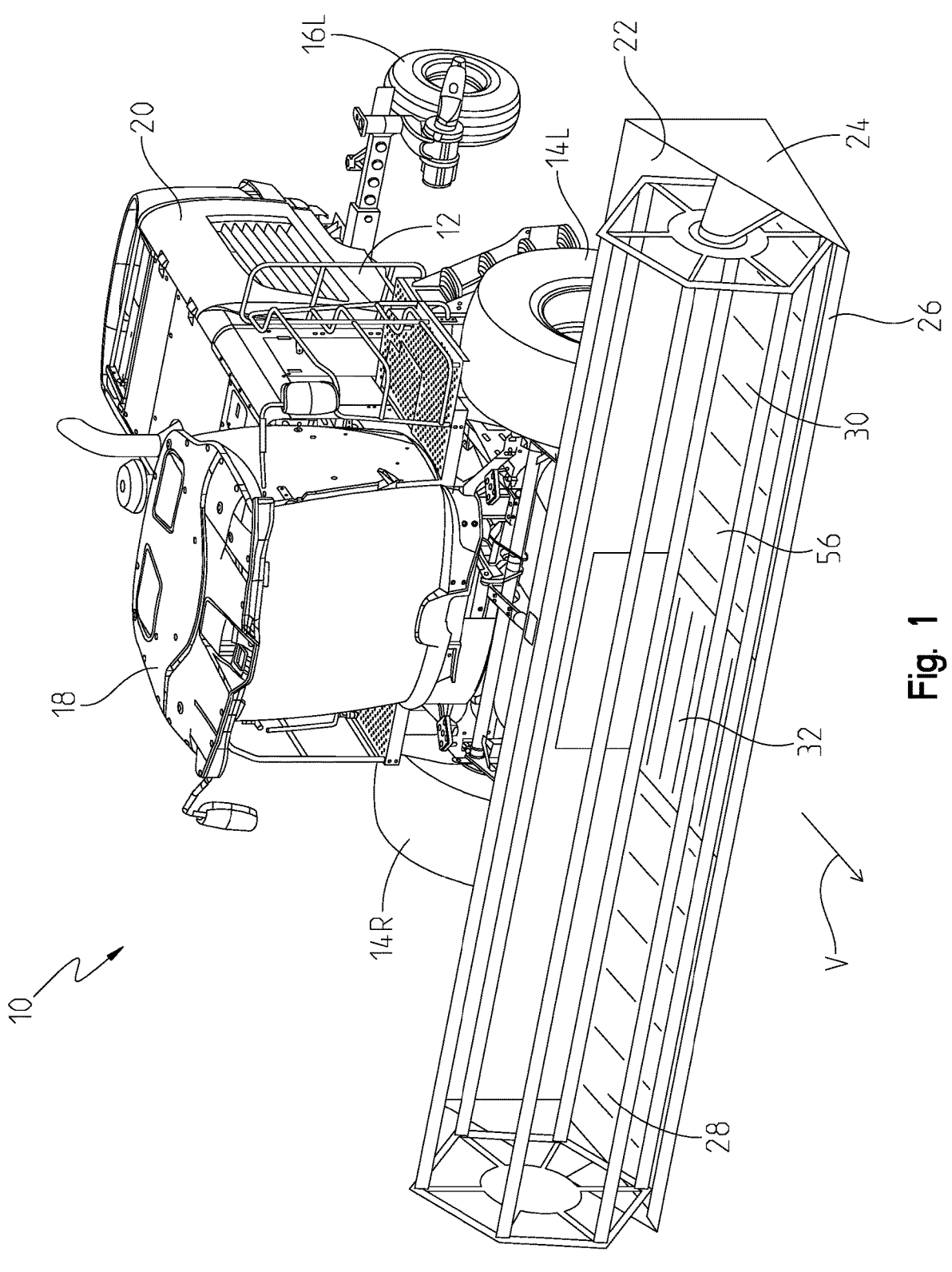
FIG. 1 is a side front perspective view of an agricultural machine including a mower implement positioned at a front end of the agricultural machine.

Referring to FIG. 1, an agricultural machine 10 is shown and is operable to mow crop in a field. The agricultural machine 10 includes a main frame 12 supported on right and left front wheels 14R and 14L, respectively, and on right and left caster mounted rear wheels, of which only a left rear wheel 16L is shown. The agricultural machine 10 also includes a cab 18 carried on a forward region of the main frame 12 and a housing 20 illustratively shown as being positioned reward of the cab 18. A power source such as an internal combustion engine may be positioned in the housing 20. As shown in FIG. 1, the agricultural machine 10 includes a mower implement 22, which may be referred to as a draper, coupled to and supported by the forward end of the main frame 12. Operator controls are provided in the cab 18 for operation of the agricultural machine 10, including the attached mower implement 22.

The mower implement 22 includes a laterally extending frame 24 that extends perpendicular to a fore-and-aft harvesting direction of travel "V" of the agricultural machine 10. The mower implement 22 further includes an elongate reciprocating knife 26 that extends across a width of the mower implement 22. This reciprocating knife 26 is disposed immediately in front of a harvested crop conveyor assembly. In the illustrative embodiment, the crop conveyor assembly includes a right side flexible drive assembly 28 that carries harvested crop from the right side of the mower implement 22 to a central region of the mower implement 22, a left side flexible drive assembly 30 that carries crop from the left side of the mower implement 22 to the central region of the mower implement 22, and a central conveyor 32 that receives crop from the left side flexible drive assembly 30 and the right side flexible drive assembly 28, and conveys the harvested crop rearward. In the illustrative embodiment, each of the three conveyors is a conveyor with an endless belt rotated by rollers, which may be referred to as a flexible drive assembly. Moreover, the endless belt is an example of an endless loop and may be referred to as such herein. The components and arrangement of flexible drive assemblies are described in greater detail below; however, it should be appreciated that the left side flexible drive assembly 30 and the right side flexible drive assembly 28 are identical (yet mirror images of each other) such that description of one applies equally to the other. The description related to the flexible drive assembly 30 may also apply to the flexible drive assembly 32.

Figure 2:
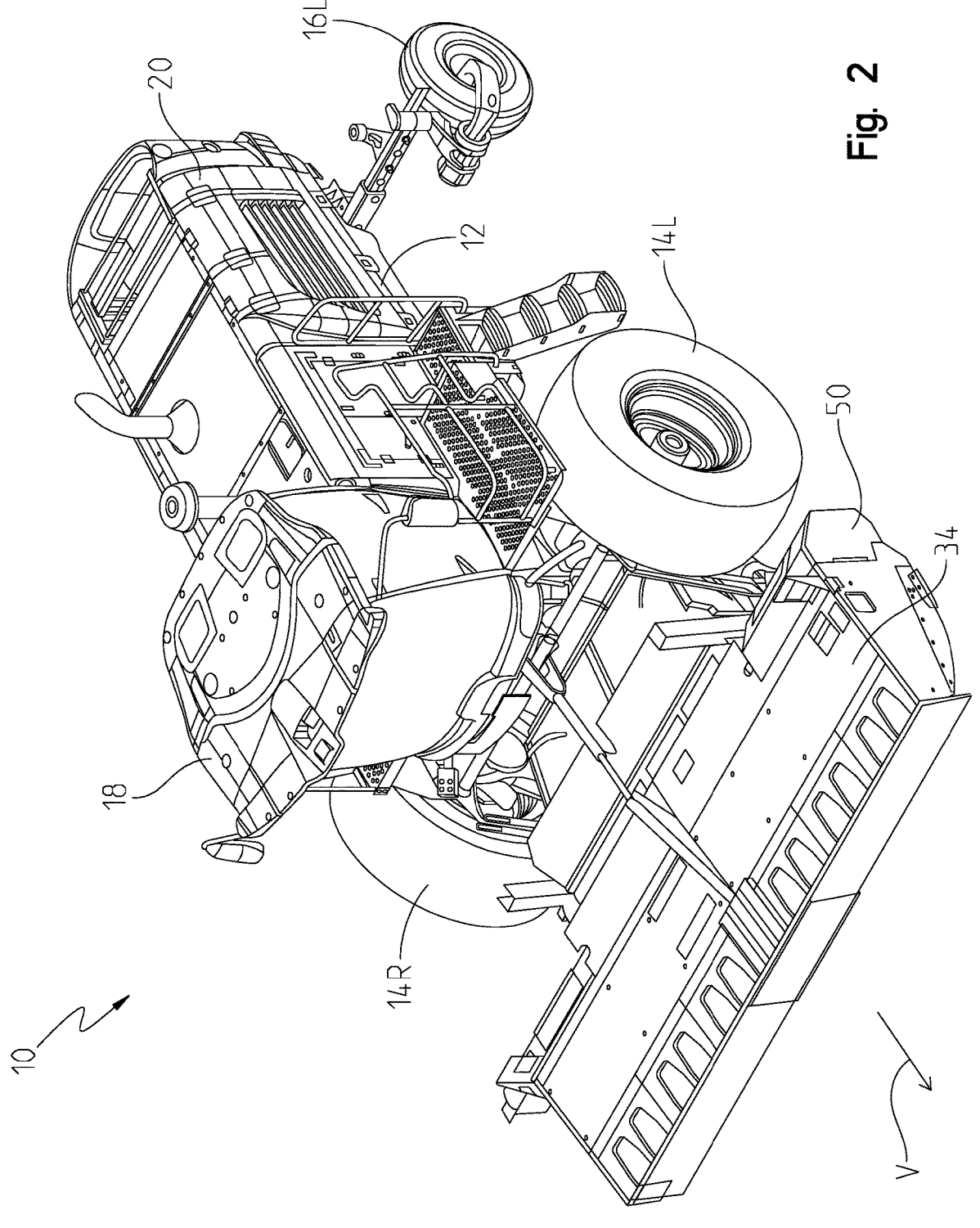
FIG. 2 is a side front perspective view of an agricultural machine including a mower-conditioner implement positioned at a front end of the agricultural machine.
Figure 3:
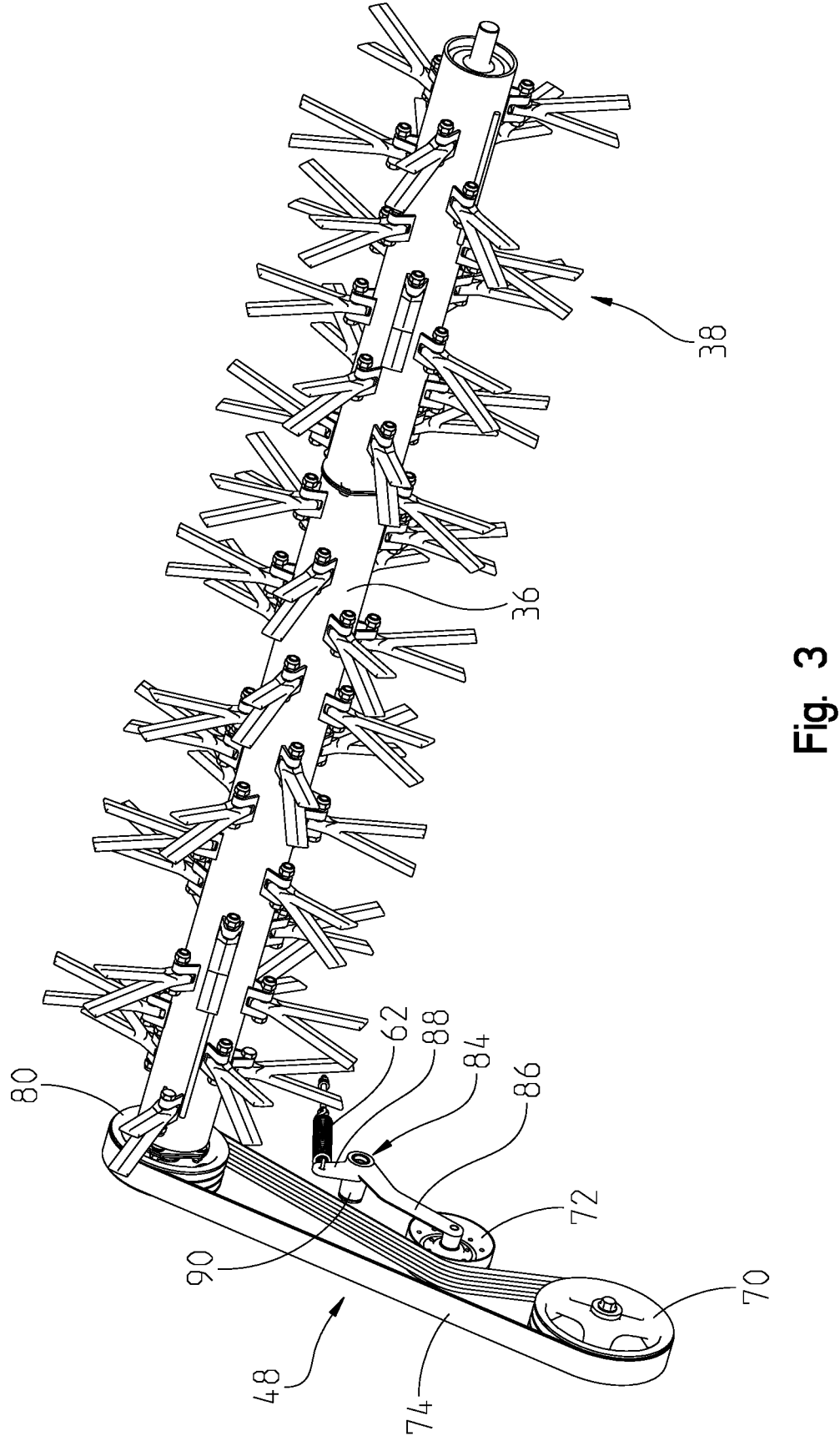
FIG. 3 is a perspective view of an impeller drive assembly, which may be included in the mower-conditioner implement of FIG. 2.
Figure 4:
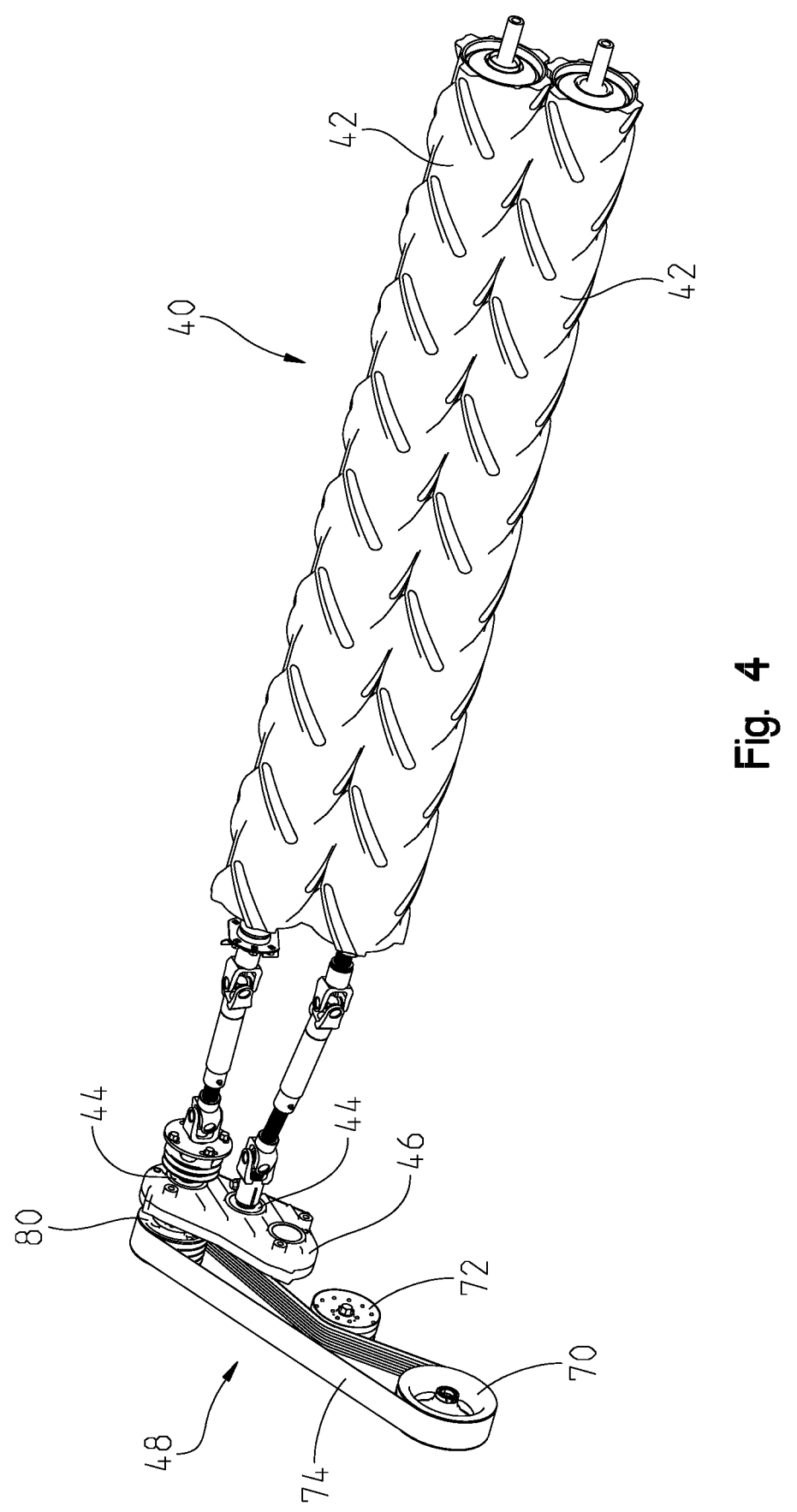
FIG. 4 is a perspective view of a roll conditioning drive assembly, which may be included in the mower-conditioner implement of FIG. 2.

The implement of the agricultural machine 10 could take many configurations in addition to that described with regard to FIG. 1. For example, as shown in FIG. 2, the implement of the agricultural machine 10 may be embodied as a mower-conditioner implement 34. It should be appreciated that the mower implement 22 and the mower-conditioner implement 34 may be collectively referred to as crop cutting implements. As shown in FIG. 3, the mower-conditioner implement 34 may include an impeller 36 (e.g., an elongated roll) with a plurality of tines 38 used to scrape harvested crop from cutting blades to shorten drying time of the crop. As shown in FIG. 4, the mower-conditioner implement 34 may otherwise include a roll conditioner 40 (e.g., a pair of cylindrical rolls 42 coupled together indirectly via a plurality of gears 44 arranged in a gear box 46), which is used to crimp crop stems to shorten drying time and mitigate exposure to environmental elements.

In any event, as shown in FIG. 2, the mower-conditioner implement 34 includes a laterally extending frame 50 that extends perpendicular to a fore-and-aft harvesting direction of travel "V" of the agricultural machine 10. In the illustrative embodiment shown in FIGS. 3-4, the mower-conditioner implement 34 includes a flexible drive assembly 48, the components and arrangement of which will be described in greater detail below.

It has been discovered that while differences exist between certain flexible drive assemblies (e.g., 30 and 48) of various mower or mower-conditioner implements, an increased drive torque (resulting in increased belt/chain force) is required when crop throughput to the implement increases; it has also been discovered that despite differences in the components and arrangement of various flexible drive assemblies, universally applicable systems and methods can be used to quantify the crop harvested by the agricultural machine. The systems and methods are described in further detail below.

Figure 5:
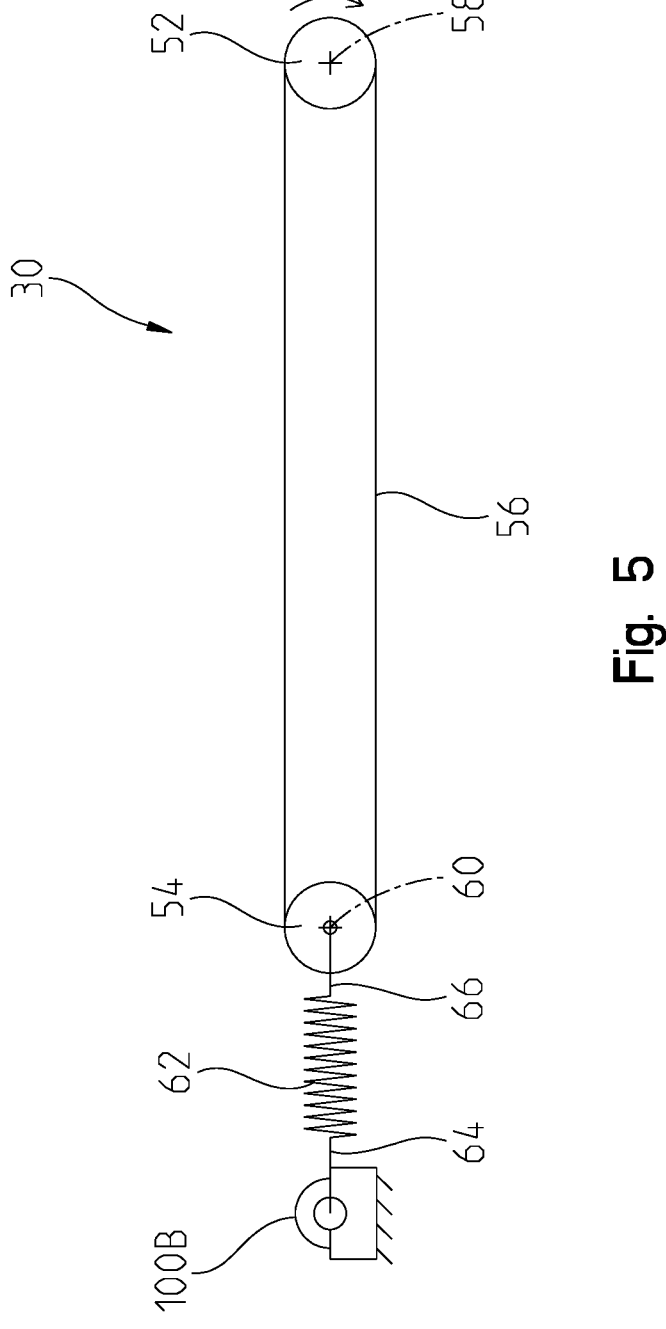
FIG. 5 is a diagrammatic view of a flexible drive assembly for the mower implement of FIG. 1 including a drive belt, a drive roller, a flex roller movable relative to the drive roller, and a spring coupled to the flex roller.

Referring now to FIG. 5, the flexible drive assembly 30 is shown in a diagrammatic view. In the illustrative embodiment, the flexible drive assembly 30 includes a drive roller 52, a flex roller 54, and an endless loop 56. The endless loop 56 is also shown in FIG. 1. The drive roller 52 may be driven directly or indirectly by a hydraulic pump, an electric motor, an internal combustion engine, or the like. In the illustrative embodiment, the endless loop 56 is a belt formed of elastomeric material; however, in other embodiments the elastomeric belt may be replaced with a metallic mesh or any other material suitable for conveying crop along the flexible drive assembly 30. It should be appreciated that for the flexible drive assembly 30 the endless loop 56 is configured to engage with (i.e., support and convey) the harvested crop; however unlike a baler belt, for example, the endless loop 56 does not compact harvested crop to form a bale.

Referring still to FIG. 5, the drive roller 52 is centered on a drive roller axis 58 about which the drive roller 52 rotates. The drive roller axis 58 is fixed relative to the frame 24 of the mower implement 22. In some embodiments, the drive roller 52 may rotate about a pin or bore that is positioned along the drive roller axis 58 and coupled directly or indirectly to the frame 24 of the mower implement 22. The flex roller 54 is centered on a flex roller axis 60 about which the flex roller 54 rotates. The flex roller axis 60 is movable relative to the frame 24 of the mower implement 22; therefore, the flex roller axis 60 is movable relative to the drive roller axis 58 as well. In some embodiments, the flex roller 54 may rotate about a pin or bore that is positioned along the flex roller axis 60 and coupled directly or indirectly to the frame 24 of the mower implement 22. As shown in FIG. 5, the endless loop 56 contacts the drive roller 52 and the flex roller 54 such that rotation of the drive roller 52 drives rotation of the endless loop 56 thereby driving rotation of the flex roller 54.

As suggested by FIG. 5, in the flexible drive assembly 30, the drive roller 52 and the flex roller 54 are each positioned within the endless loop 56. Additionally, in the illustrative embodiment, the drive roller axis 58 and the flex roller axis 60 are parallel to each other.

In some embodiments, the mower implement 22 further includes a device configured to resist movement of the flex roller axis 60. It should be appreciated that "resisting" movement, as the term is used herein, does not prevent movement; it merely makes it more difficult. To illustrate, as additional crop is accumulated atop the endless loop 56, the drive torque required to the rotate endless loop 56 at the same speed increases. This causes an increase in the tension of the endless loop 56, which causes movement of the flex roller 54 (and the flex roller axis 60) toward to the drive roller 52. In the illustrative embodiment shown in FIG. 5, the device configured to resist movement of the flex roller axis 60 is a spring 62. As shown in FIG. 5, the spring 62 includes a first end 64 fixed relative to the drive roller axis 58 (and relative to the frame 24) and a second end 66 movable relative to the drive roller axis 58 (and relative to the frame 24). As a result, the length of the spring 62 varies with movement of the flex roller axis 60 relative to the drive roller axis 58 (and relative to the frame 24).

In other embodiments, the spring 62 coupled to the flexible drive assembly 30 may be replaced with a linear actuator 68 (see FIG. 8) or another suitable device for resisting movement of the flex roller axis 60. The spring 62 and linear actuator 68 may be descriptively referred to herein as retractable linear devices based on their structure. The linear actuator 68 will be described in greater detail with regard to FIG. 8.

Figure 6:
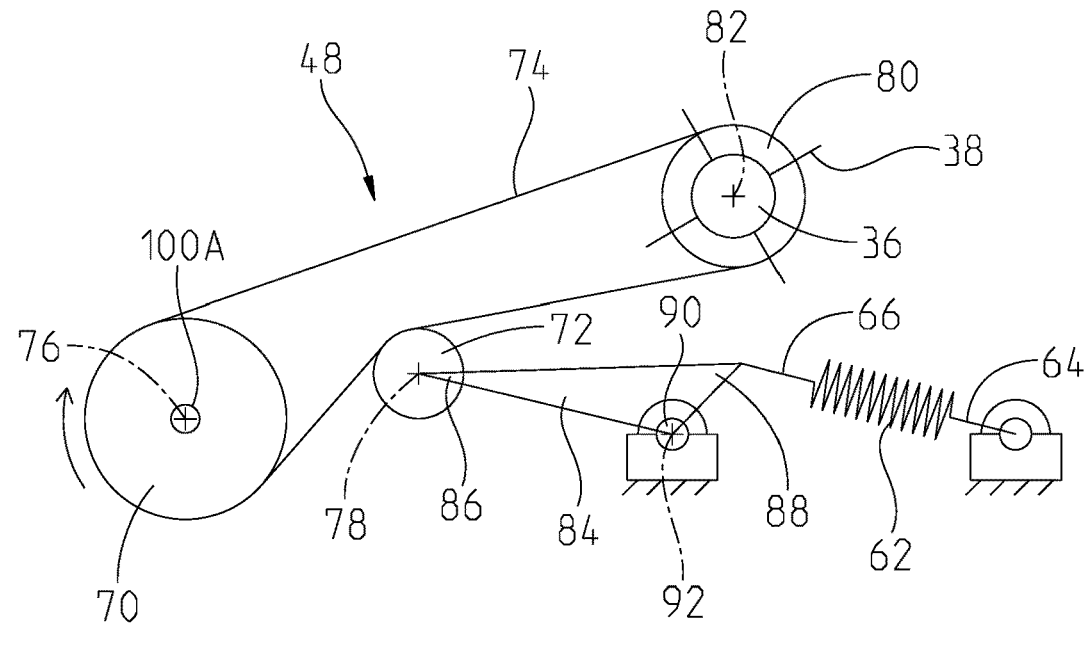
FIG. 6 is a diagrammatic view of a flexible drive assembly for the mower-conditioner implement of FIG. 2 including a drive belt, a drive roller, a driven roller, a flex roller positioned outside the drive belt and movable relative to the drive roller, and a spring coupled to the flex roller.

Another flexible drive assembly 48 is shown in FIGS. 3, 4, and 6. In the illustrative embodiment, the flexible drive assembly 48 includes a drive roller 70, a flex roller 72, and an endless loop 74. The drive roller 70 may be driven directly or indirectly by a hydraulic pump, an electric motor, an internal combustion engine, or the like. In the illustrative embodiment, the endless loop 74 is a belt formed of elastomeric material; however, in other embodiments the elastomeric belt may be replaced with a metallic mesh or any other material suitable for operating in the flexible drive assembly 48. It should be appreciated that for the flexible drive assembly 48 the endless loop 74 does not engage with the harvested crop; thus, unlike a baler belt, for example, the endless loop 74 does not compact harvested crop to form a bale.

Referring still to FIGS. 3, 4, and 6, the drive roller 70 is centered on a drive roller axis 76 about which the drive roller 70 rotates. The drive roller axis 76 is fixed relative to the frame 50 of the mower-conditioner implement 34. In some embodiments, the drive roller 70 may rotate about a pin or bore that is positioned along the drive roller axis 76 and coupled directly or indirectly to the frame 50 of the mower-conditioner implement 34. As shown in FIG. 6, the flex roller 72 is centered on a flex roller axis 78 about which the flex roller 72 rotates. The flex roller axis 78 is movable relative to the frame 50 of the mower-conditioner implement 34; therefore, the flex roller axis 78 is movable relative to the drive roller axis 76 as well. In some embodiments, the flex roller 72 may rotate about a pin or bore that is positioned along the flex roller axis 78 and coupled directly or indirectly to the frame 50 of the mower-conditioner implement 34. As shown in FIGS. 3, 4, and 6, the endless loop 74 contacts the drive roller 70 and the flex roller 72 such that rotation of the drive roller 70 drives rotation of the endless loop 74 thereby driving rotation of the flex roller 72.

Referring still to FIGS. 3, 4, and 6, the flexible drive assembly 48 further includes a driven roller 80. As shown in FIG. 6, the driven roller 80 is centered on a driven roller axis 82 about which the driven roller 80 rotates. The driven roller axis 82 is fixed relative to the frame 50 of the mower-conditioner implement 34; therefore, the driven roller axis 82 is fixed relative to the drive roller axis 76 as well. In some embodiments, the driven roller 80 may rotate about a pin or bore that is positioned along the driven roller axis 82 and coupled directly or indirectly to the frame 50 of the mower-conditioner implement 34. As shown in FIGS. 3, 4, and 6, the endless loop 74 contacts the drive roller 70 and the driven roller 80 such that rotation of the drive roller 70 drives rotation of the endless loop 74 thereby driving rotation of the driven roller 80. In FIGS. 3 and 6, the driven roller 80 is coupled to the impeller 36 to drive rotation of the impeller 36. It should be appreciated that in other embodiments the driven roller 80 may be coupled to the plurality of gears 44 to drive rotation thereof, which drives rotation of the oppositely rotating rolls 42.

As suggested by FIGS. 3, 4, and 6, in the flexible drive assembly 48, the drive roller 70 and the driven roller 80 are positioned within the endless loop 74, yet the flex roller 72 is positioned outside the endless loop 74. Additionally, in the illustrative embodiment, the drive roller axis 76, the flex roller axis 78, and the driven roller axis 82 are parallel to each other.

Referring now to FIG. 6 (and also shown in FIG. 3), the agricultural machine 10 further includes a bracket 84 having a first portion 86, a second portion 88, and a third portion 90. In the illustrative embodiment, the first portion 86 of the bracket 84 is directly coupled to the flex roller 72. The second portion 88 of the bracket 84 is directly coupled to a retractable linear device, which is embodied as the spring 62 in FIGS. 3 and 6; however, it should be appreciated that the retractable linear device could also be embodied as the linear actuator 68 (see FIG. 8) or another suitable device for resisting movement of the flex roller axis 78. In the illustrative embodiment, the second portion 88 of the bracket 84 is coupled to the second end 66 of the spring 62. Thus, the second end 66 of the spring 62 is movable relative to the drive roller axis 76 (and relative to the frame 50), and the first end 64 of the spring 62 is fixed relative to the drive roller axis 76 (and relative to the frame 50). The third portion 90 of the bracket 84 includes a pivot axis 92 passing therethrough. The bracket 84 is pivotably coupled to the frame 50 at the pivot axis 92 such that the bracket 84 may pivot relative to the frame 50 as the flex roller axis 78 moves relative to the frame 50.

Figure 7:
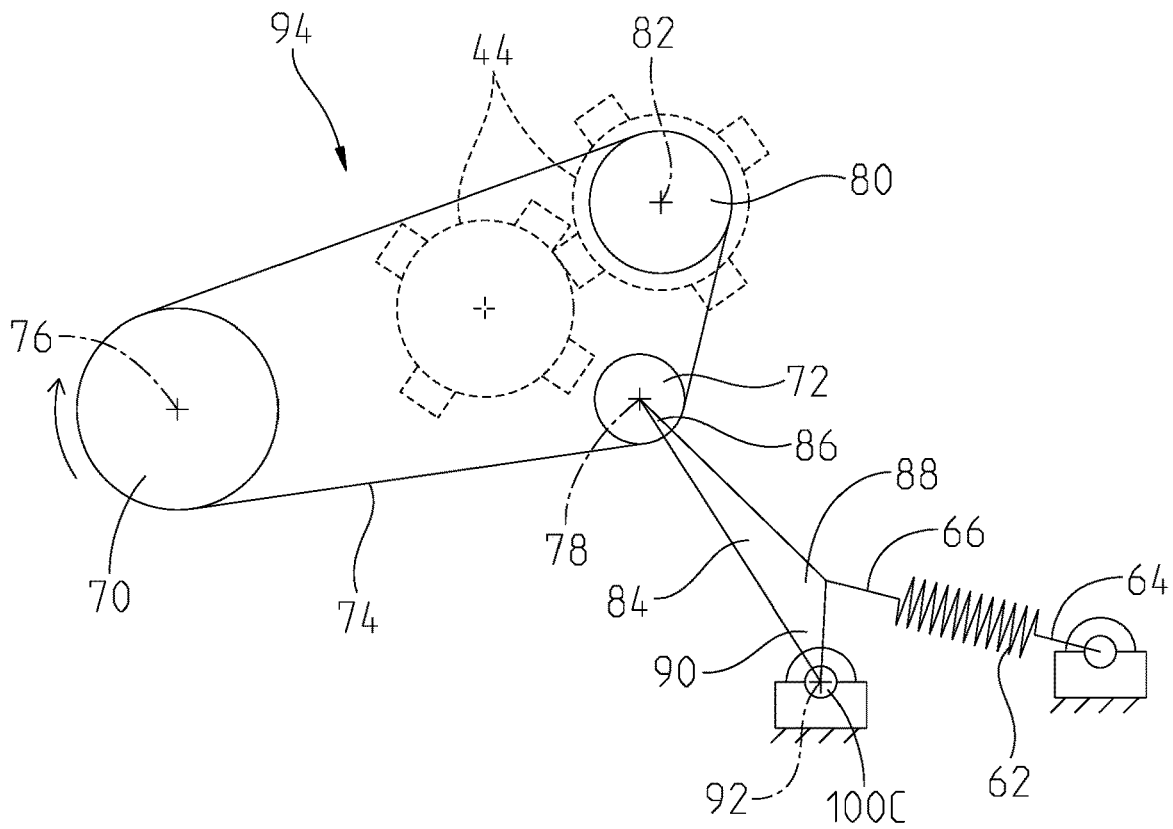
FIG. 7 is a diagrammatic view of a flexible drive assembly similar to FIG. 6, where instead the flex roller is positioned inside the drive belt.

Another flexible drive assembly 94 is shown in FIG. 7. The same reference numbers are used to describe like components of the flexible drive assemblies 48 and 94. One difference between the drive assemblies 48, 94 is that in the flexible drive assembly 94, the flex roller 72 is positioned inside the endless loop 74. In FIG. 7 (like FIG. 4), the driven roller 80 is coupled to the plurality of gears 44 to drive their rotation, which drives rotation of the oppositely rotating rolls 42. It should be appreciated that in other embodiments the driven roller 80 is coupled to the impeller 36 to drive its rotation. Similar to the flexible drive assembly 48, in the flexible drive assembly 94, the endless loop 74 does not engage with the harvested crop; therefore, unlike a baler belt, for example, the endless loop 74 does not compact harvested crop to form a bale.

Figure 8:
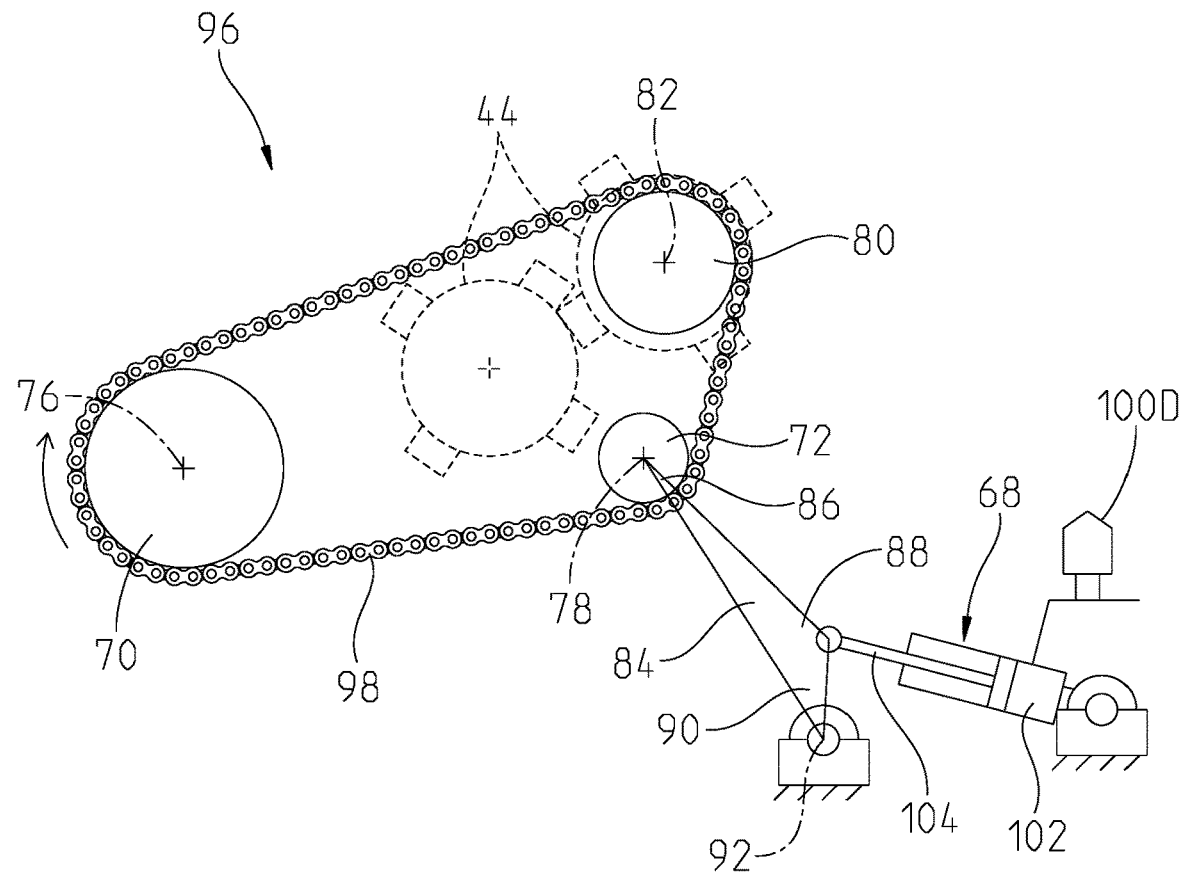
FIG. 8 is a diagrammatic view of a flexible drive assembly similar to FIG. 7, where instead the drive belt has been replaced by a metallic chain and the spring has been replaced by a linear actuator.

Another flexible drive assembly 96 is shown in FIG. 8 The same reference numbers are used to describe like components of the flexible drive assemblies 94 and 96. One difference between the drive assemblies 94, 96 is that in the flexible drive assembly 96, the endless loop 98 is embodied as a metallic chain.

Also, as shown in FIG. 8, the linear actuator 68 may include a hollow rod 102 and a piston 104 configured to extend and retract relative to the hollow rod 102. In the illustrative embodiment, the hollow rod 102 is fixed relative to the drive roller axis 76 (and the frame 50) and the piston 104 is movable relative to the drive roller axis 76 (and the frame 50); however, in some embodiments, the arrangement of the piston 104 and the hollow rod 102 may be reversed.

Figure 9:
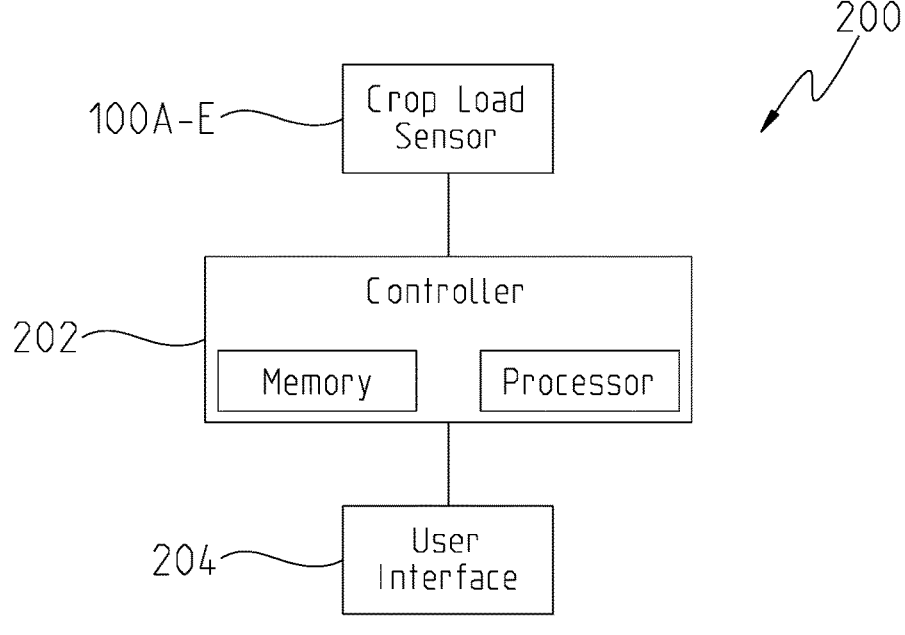
FIG. 9 is a perspective view of a control system including a crop load sensor operatively coupled to a controller.

As shown in FIG. 9, the agricultural machine 10 further includes at least one crop load sensor 100A-E configured to measure a characteristic of the agricultural machine 10 associated with the quantity (or load) of harvested crop being processed by the flexible drive assembly 30, 48, 94, 96. In some embodiments (see FIG. 6), a crop load sensor 100A directly measures a change in location of the flex roller axis 78 relative to the drive roller axis 76. This is because movement of a flex roller axis relative to a drive roller axis results from a change in tension of an endless loop, which results from a change in the quantity of harvested crop being processed by the flexible drive assembly. As shown in FIG. 6, the crop load sensor 100A may be a proximity sensor positioned, for example, on a bore or pin aligned with the drive roller axis 76. The proximity sensor may be used with a target (as is known in the art), which is illustratively located on a bore or pin aligned with the flex roller axis 78. In other embodiments, any other suitable sensor may be used to measure movement of a flex roller (or a component that moves therewith) relative to a portion of a corresponding frame 24, 50 (or any component fixed relative to the frame 24, 50).

In other embodiments, at least one crop load sensor (100B-E) is configured to measure a characteristic of the agricultural machine 10 that is a proxy for the change in location of a flex roller axis relative to a drive roller axis. For example, as suggested by FIG. 5, the crop load sensor 100B is configured to measure the tension of the spring 62, given a known spring length and known spring constant. In other embodiments, as shown in FIG. 8, the crop load sensor 100D is configured to measure the pressure of the linear actuator 68. In other embodiments, as shown in FIG. 7, the crop load sensor 100C is configured to measure the degree of rotation of the bracket 84 (about its pivot axis 92) relative to the frame 50. In other embodiments, a crop load sensor 100 E may be configured to measure a change in the length of a retractable linear device. Each of these measurement are characteristics of the agricultural machine 10 associated with the quantity of harvested crop being processed by the flexible drive assembly 30, 48, 94, 96. While various crop load sensors 100A-E are described with respect to specific embodiments, each crop load sensor 100A-E may be applicable to the other embodiments described herein.

Referring again to FIG. 9, a diagrammatic view of a control system 200 of the agricultural machine 10 is shown. The control system 200 includes a controller 202 having a memory and a processor configured to execute instructions (i.e., algorithmic steps) stored on the memory. The controller 202 may be a single controller or a plurality of controllers operatively coupled to one another. The controller 202 may be housed by the agricultural machine 10 or positioned remotely, away from the agricultural machine 10. The controller 202 may be hardwired or connected wirelessly to other components of the agricultural machine 10 via Wi-Fi, Bluetooth, or other known means of wireless communication.

As suggested by FIG. 9, the controller 202 is operatively coupled to the crop load sensor 100A-E and configured to receive a signal from the at least one crop load sensor 100A-E indicative of the measured characteristic of the agricultural machine 10 associated with the quantity of harvested crop being processed by the flexible drive assembly 30, 48, 94, 96. The controller 202 is configured to determine the quantity of harvested crop being processed by the flexible drive assembly 30, 48, 94, 96 based on the received signal indicative of the measured characteristic of the agricultural machine 10. More specifically, in terms of an algorithm, the controller 202 may multiply a measured value (e.g., (i) a tension of a retractable linear device, (ii) a pressure of a retractable linear device, (iii) a length of a retractable linear device, (iv) a degree of rotation of a bracket relative to a frame, or (v) a location of a flex roller relative to a portion of a frame or other component fixed relative to the frame) by a predetermined constant, e.g., a value stored in the memory, to determine the quantity of harvested crop processed by the mower or mower-conditioner implement 22, 34.

The controller 202 may be operatively coupled to a user interface 204 and configured to receive input data from the user via a user interface 204 such as the predetermined constant. Moreover, the controller 202 may output data to the user interface 204 such as the determined quantity of crop processed by the mower or mower-conditioner implement 22, 34.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural machine capable of sensing a harvested crop load, comprising:
   a crop cutting implement including a frame and a flexible drive assembly supported by the frame, the flexible drive assembly including:
      a drive roller configured to rotate about a drive roller axis that is fixed relative to the frame,
      a flex roller that is driven by the drive roller to rotate about a flex roller axis that is movable relative to the drive roller axis, and
      an endless loop contacting the drive roller and the flex roller to drive rotation of the flex roller about the flex roller axis;
   a retractable linear device including a first end fixed relative to the frame and a second end movable relative to the frame, wherein the retractable linear device is configured to resist movement of the flex roller axis relative to the drive roller axis; and
   at least one crop load sensor configured to measure a characteristic of the agricultural machine associated with the quantity of harvested crop being processed by the flexible drive assembly, the at least one crop load sensor comprising a proximity sensor coupled to the drive roller, wherein the measured characteristic comprises a measured linear distance between the proximity sensor and a target location of the flex roller, as directly measured by the at least one crop load sensor, a change in the measured linear distance being in response to movement of the flex roller that is indirectly induced by variations in the harvested crop load, and wherein the quantity of harvested crop is determined based on the measured linear distance.

2. The agricultural machine of claim 1, further comprising:
   a controller operatively coupled to the at least one crop load sensor and configured to receive a signal from the at least one crop load sensor indicative of the measured characteristic of the agricultural machine;
   wherein the controller is configured to determine the quantity of harvested crop being processed by the flexible drive assembly based on the signal indicative of the measured characteristic of the agricultural machine.

3. The agricultural machine of claim 1, wherein the retractable linear device is a spring; and
   wherein the at least one crop load sensor further comprises a second sensor configured to measure the tension of the spring.

4. The agricultural machine of claim 1, wherein the retractable linear device is a linear actuator including a hollow rod and a piston configured to extend and retract relative to the hollow rod; and
   wherein the at least one crop load sensor further comprises a second sensor configured to measure the pressure of the linear actuator.

5. The agricultural machine of claim 1, wherein the flexible drive assembly further includes a driven roller positioned inside the endless loop and rotatably driven by the endless loop about a driven roller axis that is fixed relative to the drive roller axis.

6. The agricultural machine of claim 1, wherein the flex roller is positioned outside of the endless loop.

7. The agricultural machine of claim 1, wherein the flex roller is rotatably coupled to a first portion of a bracket; and
   wherein the second end of the retractable linear device is coupled to a second portion of the bracket.

8. The agricultural machine of claim 7, wherein the bracket is pivotably coupled to the frame at a pivot axis of the bracket passing through a third portion of the bracket.

9. The agricultural machine of claim 8, wherein the at least one crop load sensor further comprises a second sensor configured to measure the degree of rotation of the bracket about the pivot axis.

10. The agricultural machine of claim 8, wherein the flex roller is positioned inside of the endless loop.

11. The agricultural machine of claim 8, wherein the flex roller is positioned outside of the endless loop.

12. The agricultural machine of claim 1, wherein the endless loop does not compact the harvested crop.

13. The agricultural machine of claim 1, wherein the endless loop does not engage with the harvested crop.

14. The agricultural machine of claim 13, wherein the crop cutting implement further includes:
   a pair of oppositely rotating elongated rolls that are configured to engage with the harvested crop; and
   a plurality of gears rotationally driven by the drive roller via the endless loop and coupled to the pair of oppositely rotating elongated rolls to cause rotation thereof.

15. The agricultural machine of claim 1, wherein the crop cutting implement further includes:
   an elongated roll rotationally driven by the drive roller via the endless loop; and
   a plurality of tines extending from the elongated roll and configured to engage with the harvested crop.

16. An agricultural machine capable of sensing a harvested crop load, comprising:
   a crop cutting implement including a frame and a flexible drive assembly supported by the frame, the flexible drive assembly including:

a drive roller configured to rotate about a drive roller axis that is fixed relative to the frame, a flex roller that is driven by the drive roller and configured to rotate about a flex roller axis that is movable relative to the drive roller axis, and an endless loop contacting the drive roller and the flex roller to drive rotation of the flex roller about the flex roller axis;

a retractable linear device including a first end fixed relative to the frame and a second end movable relative to the frame, wherein the retractable linear device is configured to resist movement of the flex roller axis which is induced by a change in the quantity of harvested crop being processed by the flexible drive assembly; and at least one crop load sensor configured to measure a characteristic of the agricultural machine associated with the quantity of harvested crop being processed by the flexible drive assembly, wherein the measured characteristic comprises a measured linear distance between a proximity sensor coupled to the drive roller and a target location of the flex roller, as directly measured by the at least one crop load sensor, a change in the measured linear distance being in response to movement of the flex roller that is indirectly induced by variations in the harvested crop load, and wherein the quantity of harvested crop is determined based on the measured linear distance.

17. The agricultural machine of claim 16, wherein the measured characteristic of the agricultural machine associated with the quantity of harvested crop being processed by the flexible drive assembly further includes at least one of:

a tension of the retractable linear device;

a pressure of the retractable linear device;

a length of the retractable linear device;

a degree of rotation of a bracket relative to the frame, the bracket being coupled at a first portion thereof to the flex roller and at a second portion thereof to the retractable linear device; and a location of the flex roller relative to a portion of the frame or a component fixedly coupled thereto.

18. The agricultural machine of claim 17, wherein the flexible drive assembly further includes a driven roller positioned inside the endless loop and rotatably driven by the endless loop about a driven roller axis that is fixed relative to the drive roller axis.

19. A method of sensing a crop load harvested by an agricultural machine, comprising:

harvesting a crop with blades of a crop cutting implement of the agricultural machine;

rotating a plurality of rollers of the crop cutting implement including a drive roller and a flex roller, wherein rotation of the flex roller is driven by rotation of the drive roller via an endless loop in contact with the drive roller and the flex roller;

advancing harvested crop into the crop cutting implement of the agricultural machine causing an increase in the drive torque required to rotate the drive roller at a constant rotational speed;

measuring a change in location of the flex roller, directly induced by the increase in drive torque required to rotate the drive roller at a constant rotational speed as harvested crop is advanced into the crop cutting implement, the change comprising a variation in a measured linear distance, as measured directly by the crop load sensor, between a proximity sensor coupled to the drive roller and a target location of the flex roller; and determining the quantity of harvested crop advanced into the crop cutting implement based on the measured change in location of flex roller.

* * * * *